United States Patent [19]

Sheen

[11] Patent Number: 4,739,696

[45] Date of Patent: Apr. 26, 1988

[54] SEPARATIVE TEA BREWING APPARATUS

[76] Inventor: Shuenn T. Sheen, No. 107, Lien Cheng Rd., Chung Ho City, Taipei Hsien, Taiwan

[21] Appl. No.: 921,108

[22] Filed: Oct. 21, 1986

[51] Int. Cl.⁴ .............................................. A47J 31/10
[52] U.S. Cl. ........................................ 99/279; 99/306; 99/323
[58] Field of Search ................. 99/279, 299, 323, 306, 99/295, 298, 300; 426/433

[56] References Cited

U.S. PATENT DOCUMENTS

| | | | |
|---|---|---|---|
| 933,917 | 9/1909 | Norwood | 99/323 |
| 1,665,143 | 4/1928 | McMillan | 99/299 |
| 2,187,029 | 1/1940 | Hevers | 99/279 |
| 4,602,557 | 7/1986 | Yip | 99/279 |

Primary Examiner—Robert W. Jenkins
Attorney, Agent, or Firm—Staas & Halsey

[57] ABSTRACT

A tea brewing apparatus comprising an upper container for simmering tea and a lower container for storing the tea brewed in the upper container. The bottom face of the upper container is provided with a tea dripping hole for allowing tea which was brewed in the upper container to flow into the lower container. A screen is disposed in the upper container and above the dripping hole so as to prevent tea leaves from dropping into the lower container. A sealing ball disposed inside the screen is attached to one end of a steel wire so that the sealing ball seals the dripping hole when it is positioned on the dripping hole. A first securement ball is attached to the other end of the steel wire outside the upper container so as to remotely control the movements of the sealing ball. A second securement ball is further attached to the steel wire at an appropriate distance from the first securement ball. The second securement ball together with a notch formed on the top edge of the upper container fixedly keeps the sealing ball in the raised position.

1 Claim, 4 Drawing Sheets

FIG_1

FIG_2

FIG_3

SEPARATIVE TEA BREWING APPARATUS

BACKGROUND OF THE INVENTION

The present invention relates to a separative tea brewing apparatus wherein the tea leaves are brewed by hot or boiling water in an upper container. After being brewed, the tea is funneled into and stored in a lower container so as to prevent the tea from getting bitter due to a prolonged soakage of tea leaves in the upper container.

In recent years, tea has become an internationally popular beverage due to its characteristic essence healthy to people. In oriental nations, particularly China and Japan, tea is a traditional drink for all types of people. Therefore, methods used for brewing tea are often quite meticulous. The species of tea leaves, the material of the container, the quality and the temperature of the water, and the brewing time are all precisely controlled. The tea set should be made as simple to use as possible in order to be broadly accepted by the people who do not usually drink tea. The present invention is therefore designed to merely comprise a few parts which can act as a whole tea brewing apparatus. Tea becomes bitter and its taste becomes worse if the tea leaves are brewed too long. Therefore, the tea after being brewed should be kept apart from tea leaves. Accordingly, it would require more containers other than the one in which tea leaves are stored and tea is brewed. The present invention is hence designed to comprise two separative containers in an apparatus for respectively brewing the tea and storing the tea.

SUMMARY

A primary object of the present invention is to provide a separative tea brewing apparatus which comprises simple elements and is easy to operate.

Another object of the present invention is to provide a separative tea brewing apparatus which comprises an upper container for brewing the tea and a lower container for storing the tea.

Still another object of the present invention is to provide a separative tea brewing apparatus wherein a control device is used to remotely control the tea flow from the upper container to the lower container.

Further objects and advantages of the present invention will become apparent as the following description proceeds, and the features of novelty which characterize the invention will be pointed out with particularity in the claims annexed to and forming a part of this disclosure.

DETAILED DESCRIPTION OF THE PREFERRED EMBODIMENT

Figure 1:
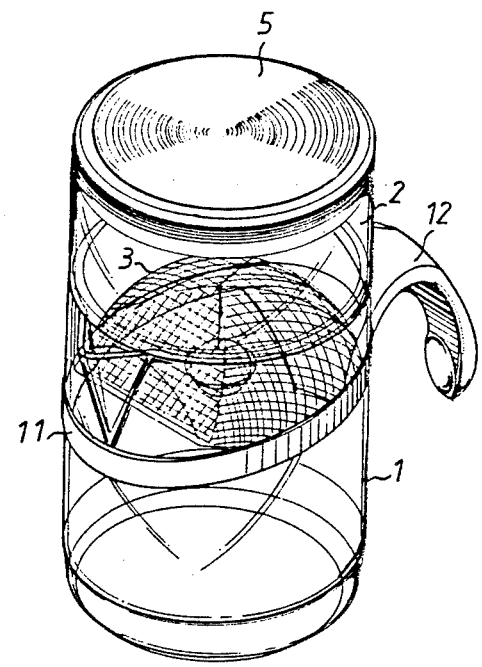
FIG. 1 is a perspective view of a separative tea brewing apparatus according to the present invention.
Figure 2:
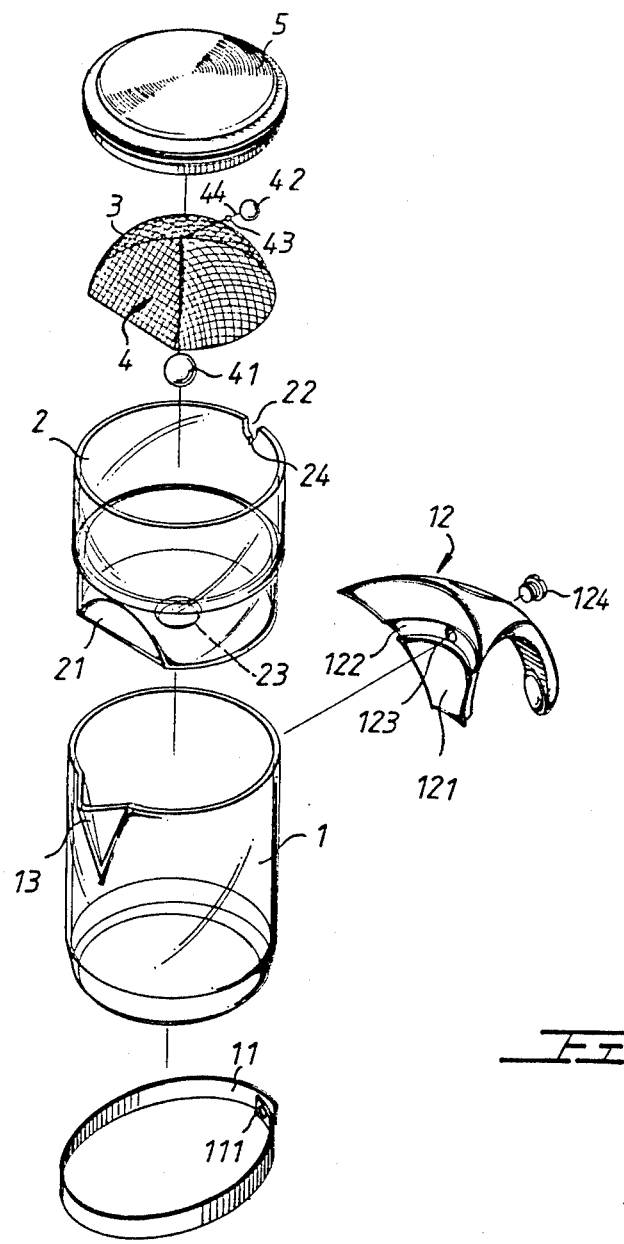
FIG. 2 is an exploded view of the tea brewing apparatus shown in FIG. 1.

Referring to FIGS. 1 and 2, it can be seen that the separative tea brewing apparatus, as a preferred embodiment of the present invention, comprises a lower container 1, an upper container 2, which is disposed on the lower container 1, a screen 3, which is disposed in the upper container 2, three steel balls 41, 42 and 43, which are connected by a steel wire 44, a top cover 5 and a handle 12, which is secured to the lower container 1 for grasping.

The lower container 1 is made of glass or any material which is safe for use as a high-temperature food container. The lower container 1 has a shape like a cylindrical cup with a spout 13 formed on the upper edge thereof. The upper container 2 is made of glass or a like material and has a stepped circumferential wall with the outer diameter of the lower portion thereof slightly smaller than that of the upper portion thereof. Therefore, the upper container 2 can be disposed on the upper edge of the lower container 1 while the lower portion of the upper container 2 can be inserted into the inner space of the lower container 1. The bottom face of the upper container 2 slopes downward from the periphery thereof to the center thereof. Further, the center of the bottom face of the upper container 2 is in a funnel shape, with a dripping hole 23 for draining the tea from the upper container 2 into the lower container 1. The lower portion of the upper container 2 is provided with a flattened portion 21 which enables the tea stored in the lower container 1 to be poured out through the spout 13. The upper edge of the upper container 2 opposite to the flattened portion 21 thereof is provided with two U-shaped notches 22 and 24. The smaller retaining notch 24 is provided on the lower portion in the larger retaining notch 22. The notches, 22 and 24, are used to respectively retain first and second securement balls 42 and 43 thereof, whose diameters are respectively larger than the widths of the two U-shaped notches 22 and 24 (which will be further described hereinafter). Moreover, the first securement ball 42 is larger than the second securement ball 43. However, the second securement ball 43 can go through the larger retaining notch 22. The screen 3 is semispherical with a part of the periphery thereof being flat in accordance with the shape of the bottom face of the upper container 2 so that the screen 3 can be disposed on the bottom face of the upper container 2. The screen 3 retains tea-leaves in the upper container 2. Three steel balls (41, 42 and 43) are connected by a steel wire 44 which passes the top grid space of the screen 3. A sealing ball 41 is secured to the end of the steel wire 44 inside the screen 3. The first securement ball 42 is secured to the other end of the steel wire 44 opposite to the sealing ball 41 and outside the upper container 2. The second securement ball 43 is further secured to the steel wire 44 between the sealing ball 41 and the first securement ball 42 at a short distance apart from the first securement ball 42. The length of the steel wire 44 between the sealing ball 41 and the first securement ball 42 is appropriately determined (to be described hereinafter). The top cover 5 is detachably disposed on the top edge of the upper container 2 to prevent the hot vapor therein from flowing out. The handle 12 is attached to the end of the lower container 1 opposite to the spout 13 thereof. The end 121 of the handle 12 proximate to the lower container 1 is arched so as to exactly fit with the lower container 1. A lateral groove 122 is formed on an appropriate position of the arched contact end 121 of the handle 12 for retaining a binding ring 11. The handle 12 is further provided with an aperture 123 from the lateral groove 122 to the outer part of the handle 12. The diameter of the aperture 123 is appropriately set so as to enable the threads of a tightening screw 124 to go through. Each end of the binding ring 11 is provided with a hole 111 into which the tightening screw 124 can screw. The tightening screw 124, whose threads have gone through the aperture 123, screws into the two holes 111 of the binding ring 11 which encloses the lower container 1. Accordingly, the handle 12 is attached to the lower container 1 with the binding ring 11 being tightened by the tightening screw 124 (see FIG. 3).

Figure 3:
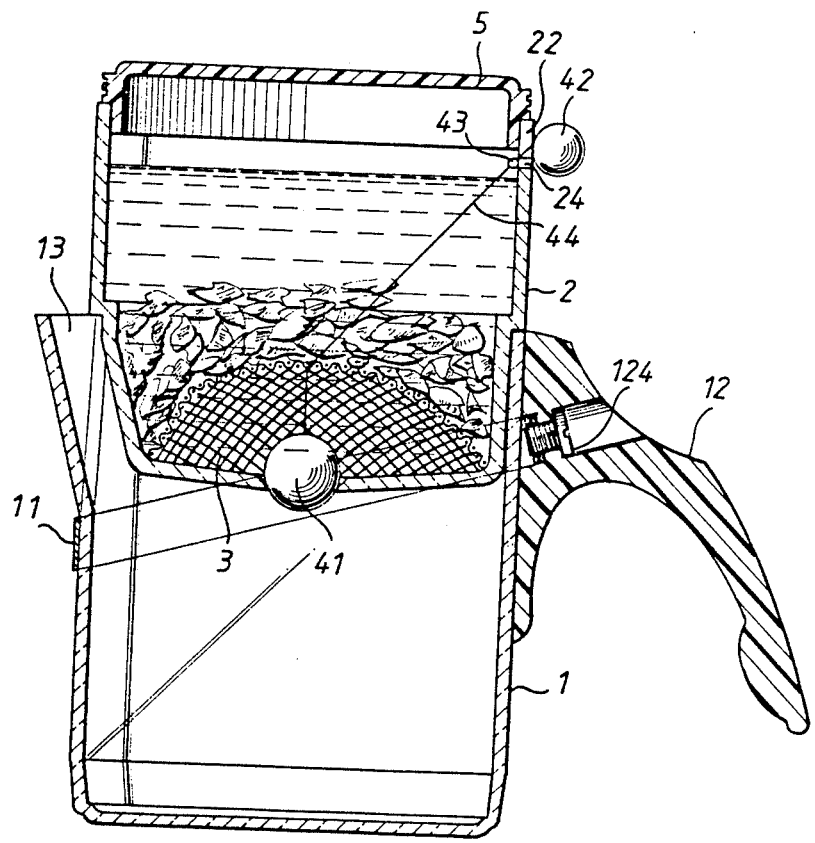
FIG. 3 is a cross-sectional view of the tea brewing apparatus, wherein tea leaves are brewed in the hot water stored in the upper container.
Figure 4:
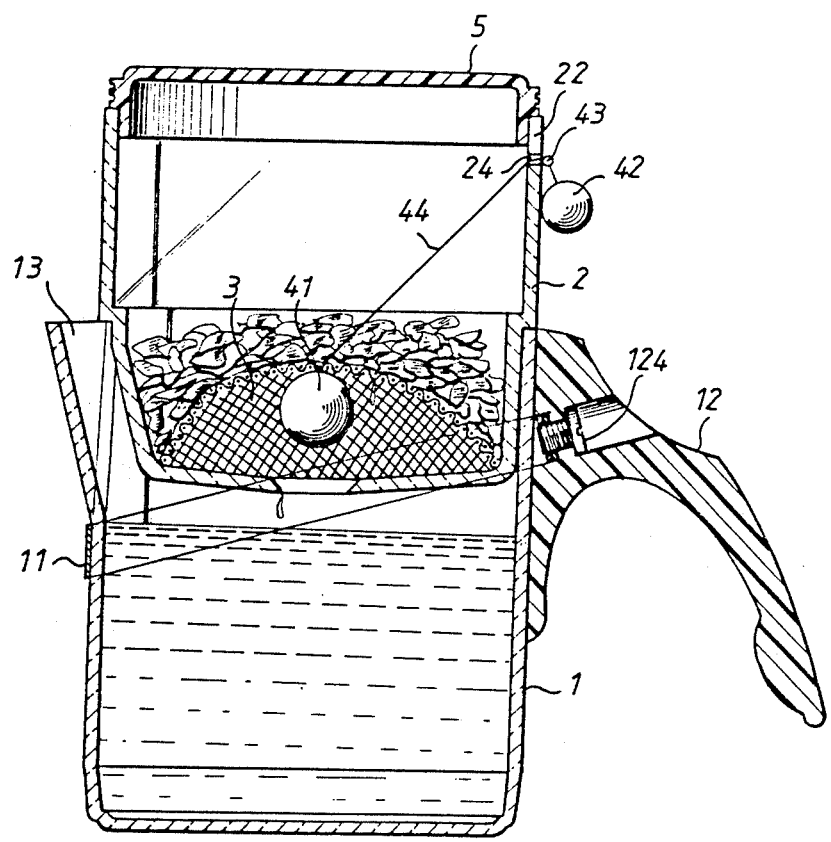
FIG. 4 is a cross-sectional view of the same tea brewing apparatus as shown in FIG. 3, wherein the tea already brewed has flowed into a lower container via a hole formed in the center of the bottom of the upper container.

Referring to FIGS. 3 and 4, the procedures of brewing tea using the present invention can be clearly seen. First, tea leaves are put into the upper container 2, which is disposed on the lower container 1, and on the screen 3. Since the sealing ball 41 is heavier than the two securement balls 42 and 43 put together, it will drop on and seal the dripping hole 23 on the bottom face of the upper container 2. The steel wire 44 is made a proper length so that the sealing ball 41 can freely rest on and seal the dripping hole 23 of the upper container 2. Secondly, hot or boiling water is poured into the upper container 2 for brewing tea. FIG. 3 shows the tea leaves being brewed by the hot water in the upper container 2. When the tea is finished brewing, the first securement ball 42 is pulled a distance away from the upper container 2 so as to let the sealing ball 41 leave the dripping hole 23 and to enable the tea to flow downwards into the lower container 1. The second securement ball 43 can also be retained by the smaller retaining notch 24 so as to keep the sealing ball 41 in a raised position. The tea in the lower container 1 may be poured out via the spout 13. The above-described procedures of brewing tea in the upper container 2 and storing tea in the lower container 1 may be repeated until the tea leaves are no longer suitable for use. It should be noted that the steel wire 44 passes through the central top grid space of the screen 3 so that the sealing ball 41 always moves vertically above the dripping hole 23 whenever the steel wire 44 is pulled or released.

As various possible embodiments might be made of the above invention, and as various adaptations might be made in the embodiment above set forth, it is to be understood that all matter herein described or shown in the accompanying drawings is to be interpreted as illustrative and not in a limiting sense. Thus it will be appreciated that the drawings are exemplary of a preferred embodiment of the invention.

I claim:
1. A separative tea brewing apparatus, comprising:
(a) a lower container having a spout on an upper edge thereof;
(b) an upper container, a circumferential wall thereof being stepped with a diameter of a lower portion thereof slightly smaller than that of an upper portion thereof, a bottom face of said upper container being inclined from a periphery thereof to a center thereof and being provided with a dripping hole in the center thereof, one larger retaining notch being formed on a top edge of said upper container, and one smaller retaining notch being formed on a lower portion in said larger retaining notch;
(c) a screen disposed on said bottom face of said upper container, said screen being semispherical;
(d) a sealing ball, a first securement ball, a second securement ball and a steel wire, said sealing ball being attached to one end of said steel wire and disposed inside said screen, said first securement ball being attached to the other end of said steel wire and being diposed outside said upper container said, second securement ball being disposed outside said screen and being attached to said steel wire and between said first securement ball and said sealing ball;
(e) a top cover, said top cover may be disposed on the top edge of said upper container;
(f) a handle attached to said lower container, one end of said handle contacting with said lower container, being arched and provided with a lateral groove, and an aperture being provided on said handle from said lateral groove to an outer part of said handle; and
(g) a binding ring enclosing said lower container, said binding ring being provided with a hole on each end thereof, and said binding ring, together with a tightening screw, binding said handle onto said lower container.

* * * * *